(12) United States Patent
Khorashadi et al.

(10) Patent No.: US 8,929,920 B2
(45) Date of Patent: Jan. 6, 2015

(54) PEER DEVICE SUPPORTED LOCATION-BASED SERVICE PROVIDER CHECK-IN

(75) Inventors: Behrooz Khorashadi, Santa Clara, CA (US); Saumitra Mohan Das, Santa Clara, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 13/214,142

(22) Filed: Aug. 19, 2011

(65) Prior Publication Data

US 2013/0045758 A1 Feb. 21, 2013

(51) Int. Cl.
| | | |
|---|---|---|
| H04W 24/00 | (2009.01) | |
| H04W 4/02 | (2009.01) | |
| H04W 4/00 | (2009.01) | |
| H04L 29/08 | (2006.01) | |

(52) U.S. Cl.
CPC .............. *H04W 4/021* (2013.01); *H04W 4/001* (2013.01); *H04W 4/028* (2013.01); *H04L 67/306* (2013.01)
USPC ...................... 455/456.3; 455/456.1; 455/457

(58) Field of Classification Search
CPC ........ H04W 4/02; H04W 4/025; H04W 4/206
USPC .................... 455/456.3, 456.1, 457
See application file for complete search history.

(56) References Cited

U.S. PATENT DOCUMENTS

| | | | |
|---|---|---|---|
| 7,024,552 B1 | 4/2006 | Caswell et al. | |
| 2006/0270419 A1 | 11/2006 | Crowley et al. | |
| 2006/0270421 A1 | 11/2006 | Phillips et al. | |
| 2007/0030824 A1 | 2/2007 | Ribaudo et al. | |
| 2008/0306826 A1 | 12/2008 | Kramer et al. | |
| 2009/0157509 A1 | 6/2009 | Little et al. | |
| 2011/0093340 A1 | 4/2011 | Kramer et al. | |
| 2011/0142016 A1 | 6/2011 | Chatterjee | |
| 2012/0191512 A1* | 7/2012 | Wuoti et al. ................. | 705/14.1 |
| 2012/0214416 A1* | 8/2012 | Kent et al. .................... | 455/41.2 |
| 2012/0252418 A1* | 10/2012 | Kandekar et al. .......... | 455/414.1 |
| 2013/0005352 A1* | 1/2013 | Jones et al. ............... | 455/456.1 |

OTHER PUBLICATIONS

He W et al., "Location Cheating: A Security Challenge to Location-Based Social Network Services", Distributed Computing Systems (ICDSC), 2011 31St International Conference on, IEEE, Jun. 20, 2011, pp. 740-749, XP031904035.

International Search Report and Written Opinion—PCT/US2012/050802 ISA/EPO—Mar. 25, 2013.

Luo, "Designing a Privacy-Aware Location Proof Architecture," Presented to the University of Waterloo in fulfillment of the thesis requirement for the degree of Master of Mathematics in Computer Science, Waterloo, Ontario, Canada, 2010, 73 pages.

* cited by examiner

*Primary Examiner* — Omoniyi Obayanju
(74) *Attorney, Agent, or Firm* — Berkeley Law & Technology Group, LLC

(57) ABSTRACT

Methods, apparatuses and articles of manufacture are provided for use in checking-in a mobile device with a location based service provider at a venue location. A candidate device check-in profile for a candidate device and one or more check-in validation schemes may, for example, be provided, directly or indirectly, to a computing device via the candidate device and/or one or more peer devices. The candidate device may, for example, be checked-in with the location based service provider in response to a determination that the candidate device check-in profile is valid.

59 Claims, 7 Drawing Sheets

600 ↘

| Associate An Estimated Location Of A First Mobile Device With A Venue Location From Which A Location Based Service Provider Permits A Check-In |
|---|

↘ 602

| Initiate Transmission Of At Least A Portion Of A Candidate Device Check-In Profile For The First Mobile Device To A Second Mobile Device That Is Identified As Being Checked-In With The Location Based Service Provider At The Venue Location |
|---|

↘ 604

| Receive An Indication That The First Mobile Device Has Been Successfully Checked-In With The Location Based Service Provider At The Venue Location |
|---|

| Associate An Estimated Location Of A First Mobile Device With A Venue Location From Which A Location Based Service Provider Permits A Check-In |
|---|

↘ 702

| Initiate Transmission Of At Least A Portion Of A Candidate Device Check-In Profile For The First Mobile Device To A Computing Device Wherein At Least A Portion Of The Candidate Device Check-In Profile Is Based, At Least In Part, On A Signal Received From A Second Mobile Device That Is Identified As Being Checked-In With The Location Based Service Provider At The Venue Location |
|---|

↘ 704

| Receive An Indication That The First Mobile Device Has Been Successfully Checked-In With The Location Based Service Provider At The Venue Location, The Indication Being Based, At Least In Part, On A Determination That The At Least The Portion Of The Candidate Device Check-In Profile That Is Based, At Least In Part, On The Signal Received From The Second Mobile Device Is Valid As Determined, At Least In Part, By The Computing Device |
|---|

```
┌─────────────────────────────────────────────────────┐
│ Perform A Check-In With A Location Based Service Provider At A │
│ Venue Location From Which The Location Based Service Provider │
│ Permits A Separate Check-In From A First Mobile Device │
└─────────────────────────────────────────────────────┘
                         │
                         ▼                         ↘ 802
┌─────────────────────────────────────────────────────┐
│ Receive At Least A Portion Of A Candidate Device Check-In Profile │
│ Associated With The First Mobile Device Scheme From The First │
│ Mobile Device │
└─────────────────────────────────────────────────────┘
                         │
                         ▼                         ↘ 804
┌─────────────────────────────────────────────────────┐
│ Transmit At Least The Portion Of The Candidate Device Check-In │
│ Profile To A Computing Device Capable Of Determining Whether The │
│ Candidate Device Check-In Profile Is Valid │
└─────────────────────────────────────────────────────┘
                                                   ↘ 806
```

```
┌─────────────────────────────────────────────────────┐
│ Perform A Check-In With A Location Based Service Provider At A │
│ Venue Location From Which The Location Based Service Provider │
│ Permits A Separate Check-In From A First Mobile Device │
└─────────────────────────────────────────────────────┘
                         │
                         ▼                         ↘ 902
┌─────────────────────────────────────────────────────┐
│ Receive A Signal From The First Mobile Device │
└─────────────────────────────────────────────────────┘
                         │
                         ▼                         ↘ 904
┌─────────────────────────────────────────────────────┐
│ Transmit At Least A Portion Of A Candidate Device Check-In Profile For │
│ Use In The Separate Check-In To The First Mobile Device │
└─────────────────────────────────────────────────────┘
                                                   ↘ 906
```

FIG. 9

PEER DEVICE SUPPORTED LOCATION-BASED SERVICE PROVIDER CHECK-IN

BACKGROUND

1. Field

The subject matter disclosed herein relates to electronic devices, and more particularly to methods, apparatuses, and/or articles of manufacture for use in providing peer device supported location-based service provider check-in capabilities.

2. Information

The Global Positioning System (GPS) represents one type of Global Navigation Satellite System (GNSS), which along with other types of satellite positioning systems (SPS) provide or otherwise support signal-based position location capabilities (e.g., navigation functions) in mobile devices, and particularly in outdoor environments. However, since some satellite signals may not be reliably received and/or acquired by a mobile device within an indoor environment or other like mixed indoor/outdoor environments, different techniques may be employed to enable position location services.

For example, mobile devices may attempt to obtain a position fix by measuring ranges to three or more terrestrial transmitters (e.g., wireless access points, beacons, cell towers, etc.) which are positioned at known locations. Such ranges may be measured, for example, by obtaining a MAC address from signals received from such transmitters and obtaining range measurements to the transmitters by measuring one or more characteristics of signals received from such transmitters such as, for example, signal strength, a round trip delay time, etc.

In certain implementations, other information may be provided to a mobile device as it enters a particular location (e.g., as tracked by a remote location server, etc.) using geofencing techniques, for example. If a particular location is in a venue location such as an airport terminal, indoor shopping mall, a particular store, etc., for example, such other information may include advertisements, messages with special offers or a directory of stores and/or establishments and products/services offered by same.

Location based service providers, such as, for example, Foursquare™, Gowilia™ and Booyah™ have introduced a venue location "check-in" process by which a mobile device entering a venue location checks-in to announce and/or record a entry or presence of the mobile device (e.g., and its user) in the venue location. Such check-in events may be used for any one of several purposes such as, for example, collecting statistics of individual venue location customers, etc. Users who frequent a particular venue location as reflected by check-in statistics may receive special privileges, discounts, etc. In certain instances, a location based service provider may, for example, have some agreement with one or more business or other like entities located at or near a particular venue location, and users who check-in from such venue locations maybe provided with an electronic coupon which may be redeemed at one of the business or other like entities. In certain instances, a location based service provider may, for example, provide social networking capabilities in which friends or buddies of a user may be informed (e.g., via electronic message) that the user has checked-in from a venue location.

In a particular example, a mobile device associated with a user/customer may obtain a position fix using one or more of the above referenced techniques, for example. Symbols representing multiple near by venue locations may then be displayed on the mobile device such as with indicators over a displayed map of the general area. A user may then select one of the displayed venue locations (e.g., by selecting an associated symbol on a touch screen or via other like user interface), and a check-in message may be transmitted from the mobile device to a computing device of the location based service provider.

One potential drawback of such a check-in processes is that an initial location of the mobile device (e.g., obtained by a position fix at the mobile device) may not be sufficiently accurate to determine which venue location a mobile device has entered or is entering (e.g., when there are multiple venue locations close together as in a pedestrian shopping environment). As such, a user is typically prompted to conduct a manual step to select from multiple potential venue locations associated with initial estimated location. Another potential drawback is that individuals may attempt to spoof or otherwise game a check-in process by, for example, generating check-in messages to a location based service provider for a venue location when in-fact the mobile device and user are not actually visiting a venue location.

Hence, there is an on-going need for techniques that allow a location based service provider to determine that a mobile device is indeed located at a venue location and/or which may allow for better venue location selection and/or check-in processes.

SUMMARY

Various methods, apparatuses, and articles of manufacture are provided which may be implemented in various devices to support checking-in one or more mobile devices with one or more location based service providers at one or more venue locations.

In certain example implementations a method may comprise, with a computing device: receiving one or more electrical signals representing a candidate device check-in profile for a first mobile device, the candidate device cheek-in profile being for use in a check-in validation scheme of a location based service provider, wherein at least a portion of the candidate device check-in profile is received via a second mobile device that is identified as being checked-in with the location based service provider at a venue location; and in response to a determination that the candidate device check-in profile is valid, identifying the first mobile device as being checked-in with the location based service provider at the venue location.

In certain example implementations an apparatus may comprise: means for receiving a candidate device check-in profile for a first mobile device, the candidate device cheek-in profile being for use in a check-in validation scheme of a location based service provider, wherein at least a portion of the candidate device check-in profile is received via a second mobile device that is identified as being checked-in with the location based service provider at a venue location; means for determining whether the candidate device check-in profile is valid; and means for identifying the first mobile device as being checked-in with the location based service provider at the venue location, in response to a determination that the candidate device check-in profile is valid.

In certain example implementations a computing device may comprise: a wireless network interface, and a processing unit to: obtain a candidate device check-in profile for a first mobile device, the candidate device check-in profile being for use in a check-in validation scheme of a location based service provider, wherein at least a portion of the candidate device check-in profile is received via a second mobile device that is identified as being checked-in with the location based service provider at a venue location; determine whether the candidate device check-in profile is valid; and identify the first mobile device as being checked-in with the location based service provider at the venue location, in response to a determination that the candidate device check-in profile is valid.

In certain example implementations an article of manufacture may comprise: a non-transitory computer readable medium having stored therein computer implementable instructions executable by a processing unit in a computing device to: obtain a candidate device check-in profile for a first mobile device, the candidate device check-in profile being for use in a check-in validation scheme of a location based service provider, wherein at least a portion of the candidate device check-in profile is received via a second mobile device that is identified as being checked-in with the location based service provider at a venue location; and in response to a determination that the candidate device check-in profile is valid, identify the first mobile device as being checked-in with the location based service provider at the venue location.

In certain other example implementations a method may comprise, with a first mobile device: associating an estimated location of the first mobile device with a venue location from which a location based service provider permits a check-in; initiating transmission of one or more electrical signals representing at least a portion of a candidate device check-in profile for the first mobile device, the candidate device check-in profile being for use in a check-in validation scheme of the location based service provider, to a second mobile device that is identified as being checked-in with the location based service provider at the venue location; and receiving one or more electrical signals representing an indication that the first mobile device has been successfully checked-in with the location based service provider at the venue location, the indication being based, at least in part, on a determination that the at least the portion of the candidate device check-in portion is valid as determined, at least in part, by a computing device that received the at least the portion of the candidate device check-in profile from the second device.

In certain other example implementations an apparatus for use in a first mobile device may comprise: means for associating an estimated location of a first mobile device with a venue location from which a location based service provider permits a check-in; means for transmitting at least a portion of a candidate device check-in profile for the first mobile device, the candidate device check-in profile being for use in a check-in validation scheme of the location based service provider, to a second mobile device that is identified as being checked-in with the location based service provider at the venue location; and means for receiving an indication that the first mobile device has been successfully checked-in with the location based service provider at the venue location, the indication being based, at least in part, on a determination that the at least the portion of the candidate device check-in portion is valid as determined, at least in part, by a computing device that received the at least the portion of the candidate device check-in profile from the second device.

In certain other example implementations a first mobile device may comprise: a wireless network interface; and a processing unit to: associate an estimated location of a first mobile device with a venue location from which a location based service provider permits a check-in; initiate transmission of at least a portion of a candidate device check-in profile for the first mobile device, the candidate device check-in profile being for use in a check-in validation scheme of the location based service provider, to a second mobile device that is identified as being checked-in with the location based service provider at the venue location; and obtain an indication that the first mobile device has been successfully checked-in with the location based service provider at the venue location, the indication being based, at least in part, on a determination that the at least the portion of the candidate device check-in portion is valid as determined, at least in part, by a computing device that received the at least the portion of the candidate device check-in profile from the second device.

In certain other example implementations an article of manufacture may comprise: a non-transitory computer readable medium having stored therein computer implementable instructions executable by a processing unit in a first mobile device to: associate an estimated location of a first mobile device with a venue location from which a location based service provider permits a check-in; initiate transmission of at least a portion of a candidate device check-in profile for the first mobile device, the candidate device check-in profile being for use in a check-in validation scheme of the location based service provider, to a second mobile device that is identified as being checked-in with the location based service provider at the venue location; and obtain an indication that the first mobile device has been successfully checked-in with the location based service provider at the venue location, the indication being based, at least in part, on a determination that the at least the portion of the candidate device check-in portion is valid as determined, at least in part, by a computing device that received the at least the portion of the candidate device check-in profile from the second device.

In still other example implementations a method may comprise, with a first mobile device: associating an estimated location of the first mobile device with a venue location from which a location based service provider permits a check-in; initiating transmission of one or more electrical signals representing a candidate device check-in profile for the first mobile device, the candidate device check-in profile being for use in a check-in validation scheme of the location based service provider, to a computing device, wherein at least a portion of the candidate device check-in profile is based, at least in part, on a signal received from a second mobile device that is identified as being checked-in with the location based service provider at the venue location; and receiving one or more electrical signals representing an indication that the first mobile device has been successfully checked-in with the location based service provider at the venue location, the indication being based, at least in part, on a determination that the at least the portion of the candidate device check-in profile that is based, at least in part, on the signal received from the second mobile device is valid as determined, at least in part, by the computing device.

In still other example implementations an apparatus for use in a first mobile device may comprise: means for associating an estimated location of a first mobile device with a venue location from which a location based service provider permits a check-in; means for transmitting a candidate device check-in profile for the first mobile device, the candidate device check-in profile being for use in a check-in validation scheme of the location based service provider, to a computing device, wherein at least a portion of the candidate device check-in profile is based, at least in part, on a signal received from a second mobile device that is identified as being checked-in with the location based service provider at the venue location; and means for receiving an indication that the first mobile device has been successfully checked-in with the location based service provider at the venue location, the indication being based, at least in part, on a determination that the at least the portion of the candidate device check-in profile that is based, at least in part, on the signal received from the second mobile device is valid as determined, at least in part, by the computing device.

In still other example implementations a first mobile device may comprise: a wireless network interface; and a processing unit to: associate an estimated location of the first mobile device with a venue location from which a location based service provider permits a check-in; initiate transmission of a candidate device check-in profile for the first mobile device, the candidate device check-in profile being for use in a check-in validation scheme of the location based service provider, to a computing device, wherein at least a portion of the candidate device check-in profile is based, at least in part, on a signal received from a second mobile device that is identified as being checked-in with the location based service provider at the venue location; and obtain an indication that the first mobile device has been successfully checked-in with the location based service provider at the venue location, the indication being based, at least in part, on a determination that the at least the portion of the candidate device check-in profile that is based, at least in part, on the signal received from the second mobile device is valid as determined, at least in part, by the computing device.

In still other example implementations an article of manufacture may comprise: a non-transitory computer readable medium having stored therein computer implementable instructions executable by a processing unit in a first mobile device to: associate an estimated location of the first mobile device with a venue location from which a location based service provider permits a check-in; initiate transmission of a candidate device check-in profile for the first mobile device, the candidate device check-in profile being for use in a check-in validation scheme of the location based service provider, to a computing device, wherein at least a portion of the candidate device check-in profile is based, at least in part, on a signal received from a second mobile device that is identified as being checked-in with the location based service provider at the venue location; and obtain an indication that the first mobile device has been successfully checked-in with the location based service provider at the venue location, the indication being based, at least in part, on a determination that the at least the portion of the candidate device check-in profile that is based, at least in part, on the signal received from the second mobile device is valid as determined, at least in part, by the computing device.

In yet other example implementations a method may comprise, with a mobile device: performing a check-in with a location based service provider at a venue location from which the location based service provider permits a separate check-in from a first mobile device; receiving one or more electrical signals representing at least a portion of a candidate device check-in profile for the first mobile device from the first mobile device, the candidate device check-in profile being for use in a check-in validation scheme of the location based service provider; and transmitting the at least the portion of the candidate device check-in profile to a computing device capable of determining whether the candidate device check-in profile is valid.

In yet other example implementations an apparatus for use in a mobile device may comprise: means for performing a check-in with a location based service provider at a venue location from which the location based service provider permits a separate check-in from a first mobile device; means for receiving at least a portion of a candidate device check-in profile for the first mobile device from the first mobile device, the candidate device check-in profile being for use in a check-in validation scheme of the location based service provider; and means for transmitting the at least the portion of the candidate device check-in profile to a computing device capable of determining whether the candidate device check-in profile is valid.

In yet other example implementations a mobile device may comprise: a wireless network interface, and a processing unit to: initiate a check-in with a location based service provider at a venue location from which the location based service provider permits a separate check-in from a first mobile device; receive at least a portion of a candidate device check-in profile for the first mobile device from the first mobile device, the candidate device check-in profile being for use in a check-in validation scheme of the location based service provider; and initiate transmission of the at least the portion of the candidate device check-in profile to a computing device capable of determining whether the candidate device check-in profile is valid.

In yet other example implementations an article of manufacture ma comprise: a non-transitory computer readable medium having stored therein computer implementable instructions executable by a processing unit in a second mobile device to: initiate a check-in with a location based service provider at a venue location from which the location based service provider permits a separate check-in from a first mobile device; receive at least a portion of a candidate device check-in profile for the first mobile device from the first mobile device, the candidate device check-in profile being for use in a check-in validation scheme of the location based service provider; and initiate transmission of the at least the portion of the candidate device check-in profile to a computing device capable of determining whether the candidate device check-in profile is valid.

In some example implementations a method may comprise, with a mobile device: performing a check-in with a location based service provider at a venue location from which the location based service provider permits a separate check-in from a first mobile device; and in response to receiving a signal from the first mobile device, transmitting one or more electrical signals representing at least a portion of a candidate device check-in profile for use in the separate check-in to the first mobile device.

In some example implementations an apparatus for use in a mobile device may comprise: means for initiating a check-in with a location based service provider at a venue location from which the location based service provider permits a separate check-in from a first mobile device; means for receiving a signal from the first mobile device; and means for transmitting at least a portion of a candidate device check-in profile for use in the separate check-in to the first mobile device.

In some example implementations a mobile device may comprise: a wireless network interface; and a processing unit to: initiate a check-in, via the wireless network interface, with a location based service provider at a venue location from which the location based service provider permits a separate check-in from a first mobile device; and in response to receiving a signal from the first mobile device, initiate transmission of at least a portion of a candidate device check-in profile for use in the separate check-in to the first mobile device.

In some example implementations an article of manufacture may comprise: a non-transitory computer readable medium having stored therein computer implementable instructions executable by a processing unit in a mobile device to: initiate a check-in with a location based service provider at a venue location from which the location based service provider permits a separate check-in from a first mobile device; and in response to receiving a signal from the first mobile device, initiate transmission of at least a portion of a candidate device check-in profile for use in the separate check-in to the first mobile device.

BRIEF DESCRIPTION OF DRAWINGS

Non-limiting and non-exhaustive aspects are described with reference to the following figures, wherein like reference numerals refer to like parts throughout the various figures unless otherwise specified.

FIG. 6 is a flow diagram illustrating certain features of an example method that may be implemented in a (candidate) first mobile device for use in a peer device supported location-based service provider check-in wherein a (peer) second mobile device transmits a candidate device check-in profile to a computing device, in accordance with an implementation.

FIG. 7 is a flow diagram illustrating certain features of an example method that may be implemented in a (candidate) first mobile device for use in a peer device supported location-based service provider check-in wherein the first mobile device transmits a candidate device check-in profile to a computing device, in accordance with an implementation.

FIG. 8 is a flow diagram illustrating certain features of an example method that may be implemented in a (peer) mobile device for use in a peer device supported location-based service provider check-in wherein the (peer) mobile device transmits a candidate device check-in profile for a (candidate) first mobile device to a computing device, in accordance with an implementation.

FIG. 9 is a flow diagram illustrating certain features of an example method that may be implemented in a (peer) mobile device for use in a peer device supported location-based service provider check-in wherein the (peer) mobile device transmits a candidate device check-in profile for a (candidate) first mobile device to the first mobile device, in accordance with an implementation.

DETAILED DESCRIPTION

Various example techniques are described herein which may be implemented in various methods, apparatuses, and/or articles of manufacture to determine that a mobile device is likely located at or near by a venue location that may be associated one or more location-based service providers, and/or which may allow for improved venue location selection and/or an enhanced check-in or other like process. For example, some peer-based or otherwise peer-supported techniques are presented herein in which a candidate device check-in profile may generated (e.g., as part of an automated check-in process or a user interactive check-in process) by a candidate device and/or a peer device, and provided to one or more computing devices of a location-based service provider. The computing device(s) may determine that a candidate device is indeed likely at or near by a particular venue location, based, at least in part, on the candidate device check-in profile (e.g., as part of a check-in process).

Figure 1:
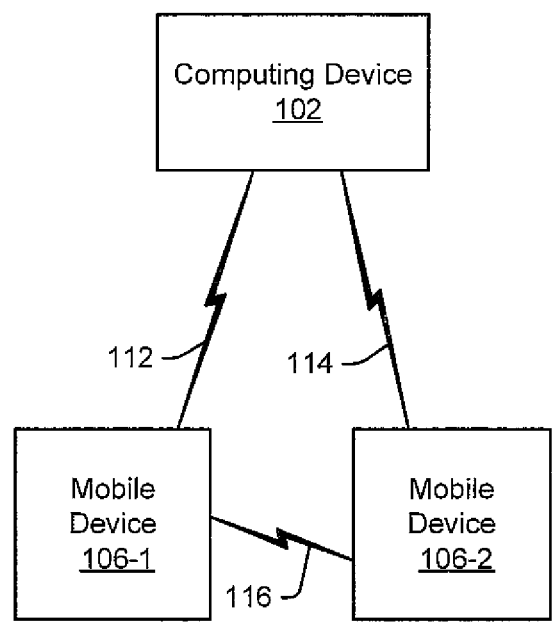
FIG. 1 is a schematic block diagram illustrating an example peer device supported location-based service provider check-in, in accordance with an implementation.

FIG. 1 is a schematic block diagram illustrating an example environment 100 that includes a first mobile device 106-1 that is to be operatively "checked-in" with regard to a location-based service provider via a computing device 102. In this example, a second mobile device 106-2, which has already been operatively checked-in with the location-based service provider via computing device 102 may be enabled to performed a peer device supported location-based service provider check-in process, in accordance with an implementation. In this example, computing device 102 may be provided as part of a location-based service and/or may provide connectivity for mobile devices to one or more other devices that may be provided as part of a location-based service. As shown, first mobile device 106-1 may communicate with computing device 102 via a wireless interface 112, and with mobile device 106-2 via a wireless interface 116. Similarly, second mobile device 106-2 may communicate with computing device 102 via a wireless interface 114.

As described herein, a peer-based or otherwise peer-supported techniques are presented herein in which first mobile device 106-1 (e.g., a candidate device) may operatively check-in through or with second mobile device 106-2 (e.g., a peer device) which may essentially vouch for the presence of first mobile device 106-1 at or nearby second mobile device 106-2 (e.g., which is already checked-in with an applicable location-based service provider for a particular venue location). For example, in certain implementations, a candidate device check-in profile may be established using first mobile device 106-1 and/or second mobile device 106-2, e.g., via communications over wireless interface 116. All or part of the resulting candidate device check-in profile may then be transmitted to computing device 102 by first mobile device 106-1 via wireless interface 112, and/or second mobile device 106-2 via wireless interface 114. Such candidate device check-in profile may then be used at computing device 102 and/or in one or more other devices to operatively check-in first mobile device 106-1 with a location-based service provider. For example, computing device 102 and/or other like devices may determine that first mobile device 106-1 is indeed likely at or near by a particular venue location, based, at least in part, on the candidate device check-in profile (e.g., as part of a check-in process).

Figure 2:
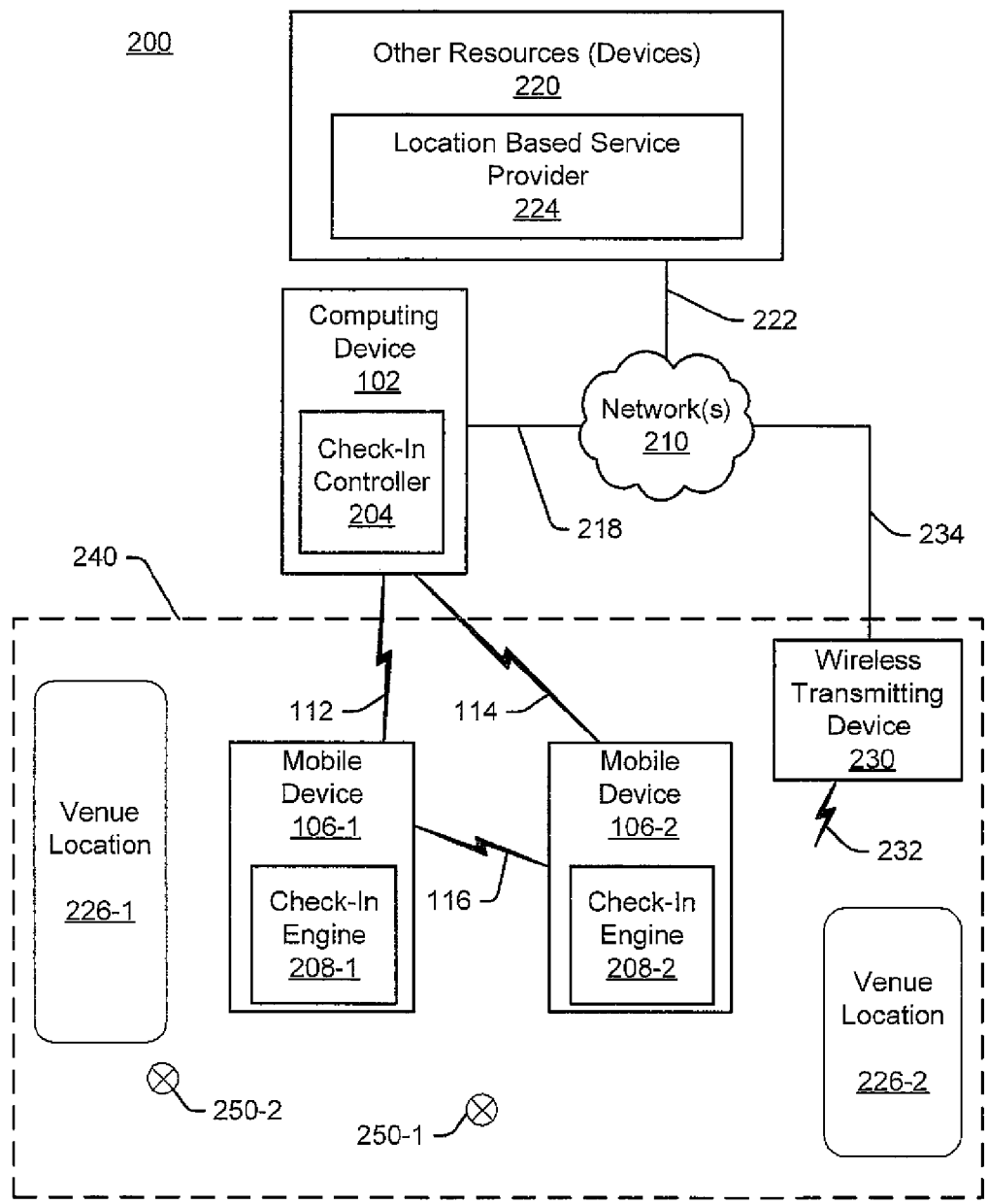
FIG. 2 is a schematic block diagram illustrating an example environment that includes a plurality of mobile devices for use in a peer device supported location-based service provider check-in, in accordance with an implementation.

With this introduction in mind, attention is drawn next to FIG. 2, which is a schematic block diagram illustrating an example environment 200 that includes a plurality of mobile devices for use in a peer device supported location-based service provider check-in, in accordance with an implementation.

As illustrated, environment 200 may comprise a computing device 102 having a check-in controller 204. Check-in controller 204 may, for example, obtain a candidate device check-in profile for a mobile device 106 and a particular check-in validation scheme, and based, at least in part, thereon determine whether the mobile device may be checked-in with a location based service provider 224. In certain example implementations, location based service provider 224 may operate in some manner by verifying that a mobile device is, or appears to be, located at or near by a particular venue location. Check-in controller 204 may, for example, compare a candidate device check-in profile to known or otherwise determinable validation criteria to determine whether a mobile device 106 is to be checked-in with location based service provider 224. Once a mobile device 106 has been checked-in with location based service provider 224, various features or other aspects of location based service provider 224 may made available to mobile device 106 and/or its user. For example, location based service provider 224 may provide a discount or other like incentive or reward for the user with regard to a venue location at or near by the mobile device 106.

As illustrated in several example implementations herein, various methods and apparatuses may be implemented in which one mobile device may be used to support a check-in with a location based service provider of another mobile device. By way of example, in certain implementations a check-in of first mobile device 106-1 may be supported by second mobile device 106-2 that has already completed a check-in with location based service provider 224. For example, second mobile device 106-2 may communicate over wireless interface 116 with first mobile device 106-1, and as a result may obtain and provide a candidate device check-in profile to computing device 102, e.g., over wireless interface 114. In another example implementation, second mobile device 106-2 may communicate over wireless interface 116 with first mobile device 106-1, and as a result first mobile device 106-1 may obtain and provide a candidate device check-in profile to computing device 102, e.g., over wireless interface 112. In still other example implementations, both first mobile device 106-1 and second mobile device 106-2 may provide all or part of a candidate device check-in profile to computing device 102.

In certain example implementations, two or more of the wireless interfaces 112, 114, or 116 may be of the same type. For example, in certain instances wireless interfaces 112, 114, or 116 may be provided via Wi-Fi and/or other like wireless local area network (WLAN) technologies. In other example implementations, two or more of the wireless interfaces 112, 114, or 116 may be of different types. For example, in certain instances wireless interface 116 may be provided via Bluetooth and/or other like short range, point-to-point, and/or other like wireless personal area network (WPAN) communication technologies.

As illustrated in FIG. 2, mobile device 106-1 may comprise a check-in engine 208-1, and mobile device 106-2 may comprise a check-in engine 208-2. Check-in engines 208-1 and 208-2 may, for example, gather, obtain, and/or otherwise generate a candidate device check-in profile for use by check-in controller 204. In certain example implementations, a check-in engine may be provided as part of an application.

It should be noted that while the examples presented herein tend to relate to one location based service provider 224 in certain example implementations check-in engine 208-1, check-in engine 208-2, and/or check-in controller 204 may be enabled to support a plurality of different location based service providers. Additionally, it should also be recognized that while the examples herein tend to be illustrated as relating to the peer support of two mobile devices (e.g., first mobile device 106-1, and second mobile device 106-2), claimed subject matter is not intended to necessarily be limited to just these two peer devices supporting a location-based service provider check-in. Indeed, a plurality of peer devices may be employed to support a location-based service provider check-in for a candidate device.

Furthermore, while first mobile device 106-1 and second mobile device 106-2 may be illustrated using similar drawings, it should be understood that these peer devices may or may not be of the same design and/or purpose. For example, in certain instances first mobile device 106-1 may comprise a smart phone or other like mobile communication device while second mobile device 106-2 may comprise a laptop, tablet, or other like portable computing device.

As shown in FIG. 2, computing device 102 may be connected to one or more wired and/or wireless network(s) 210 via a communication link 218. Network(s) 210 may, for example, be further connected to one or more other resources (devices) 220, e.g., via communication link 222. In certain example implementations, computing device 102 may comprise location based service provider 224 and/or otherwise be operatively coupled to one or more other resources (devices) 220, which as illustrated may comprise location based service provider 224.

In certain example implementations, other resources (devices) 220 may comprise one or more computing devices acting as servers, a cloud computing resource, etc. It should be noted that the various example network(s) 210 and/or communication links (e.g., 218, 222, and 234) may comprise various wired and/or wireless communication interfaces, devices, services, etc. In certain example implementations, network(s) 210 may comprise the Internet, and/or other like wide or local area communication networks and/or computing networks.

Environment 200 may, for example, comprise one or more wireless transmitting devices 230. As illustrated in FIG. 2, wireless transmitting device 230 is intended to represent any type of device that may transmit a wireless signal 232 that may be received by an applicably equipped mobile device and used in some manner to estimate a location of the mobile device. By way of example, in certain instances wireless transmitting device 230 may comprise a location beacon device, a wireless network access point, a cellular communication transceiver, a terrestrial or space-based satellite positioning system (SPS) transmitter, etc. For example, an applicably equipped mobile device may comprise a navigation receiver and/or the like which may estimate a position location of the mobile device with respect to one or more wireless transmitting devices 230 based on signal timing/propagation measurements, signal strength measurements, and/or the like. In certain example implementations, a navigation receiver and/or the like may estimate a geographic location of the mobile device. In certain example implementations, location estimation may be further supported in whole or part by one or more other computing devices external to the mobile device. As illustrated, in certain example implementations, wireless transmitting device 230 may be coupled to network(s) 210, e.g., via communication link 234. It should be noted that wireless transmitting device 230, while shown as being within box 240, may be located outside of box 240.

In certain example implementations, wireless transmitting device 230 may selectively adjust or otherwise set the signal transmission strength for wireless signal 232. Thus, for example, wireless transmitting device 230 may change the signal transmission strength for wireless signal 232 based on a predetermined schedule or possibly based on other dynamic operating aspects. Hence, it may be possible for a candidate device check-in profile to indicate a measured or otherwise identified signal strength value relating to a wireless signal 232 as received by a mobile device. As such, for example, in certain instances check-in controller 204 may compare a reported signal strength value in a candidate device check-in profile to an expected signal strength value as part of an example check-in validation scheme to possibly verify that a mobile device is at or near by a venue location.

In certain example implementations, a navigation receiver and/or the like in a mobile device 106 may be affected in some manner to attempt to refine or otherwise estimate a more accurate location under certain conditions. Thus, for example, as illustrated in FIG. 2 at a particular location (here, e.g., within box 240) there may be a plurality of venue locations from which a mobile device may check-in with location based service provider 224. Here, for example, a first venue location 226-1 and a second venue location 226-2 are shown within box 240. Also shown in box 240 is an initial estimated location 250-1 for a mobile device. However, as illustrated, initial estimated location 250-1 in this example appears to be approximately the same distance from both first venue location 226-1 and second venue location 226-2. As such, it may be difficult to properly determine which of these venue locations a mobile device may be checking-in with location based service provider 224.

In certain example implementations, a check-in engine in the mobile device may affect a navigation receiver and/or the like in an attempt to refine the estimated location, e.g., by considering additional wireless signals, performing additional analysis on signals received, requesting external support, etc. Thus, in certain instances, it may be possible to obtain a more accurate estimated location, such as, estimated location 205-2 which appears to place the mobile device closer to first venue location 226-1 than second venue location 226-2. As a result of an enhanced estimated location 250-2, a check-in engine in a mobile device and/or check-in controller 204 may then determine that a check-in to location based service provider 224 relates to first venue location 226-1.

In certain example implementations, a check-in engine in a mobile device and/or check-in controller 204 may automatically select a venue location and/or present to the user (e.g., via a user interface) one or more venue locations for user selection. For example, a determination of a particular venue location may be based, at least in part, on a historical record that may be gathered from other mobile devices with respect to the various venue locations and/or user activities at or near by a particular location. For example, various mobile device actions, movements, check-ins, etc., may be tracked or otherwise gathered over time or at certain times as part of a historical record. All or part of a historical record may be statistically analyzed or otherwise processed or considered in some manner to determine one or more selection weighting factors that may prove useful to a check-in engine in a mobile device and/or check-in controller 204 in identifying a particular venue location and/or possibly two or more likely venue locations.

For example, assume that box 240 represents a portion of a shopping mall and that first venue location 226-1 represents a popular food concession and second venue location 226-2, which is near by first venue location 226-1, represents a small shoe repair shop. Also, assume that a feature of location based service provider 224 is to provide electronic coupons or other like incentives or advertisements to users via their "checked-in" mobile devices with regard to these two different venue locations. Hence, a historical record may show that a majority of previous users at or near by estimated location 250-1 have checked-in at first venue location 226-1 (e.g., the food concession) with location based service provider 224 rather than venue location 226-2 (e.g., the shoe repair shop). Accordingly, a selection weighting factor may be based, at least in part, on such likely user-related preferences and considered by a check-in engine in a mobile device and/or check-in controller 204 to select first venue location 226-1 for (or suggest such selection to) the present user.

In certain example implementations, a computer model or the like may be employed to determine a selection weighting factor based on a predicted likelihood as to whether a mobile device may enter or otherwise arrive at a venue location, e.g., based, at least in part, an estimated location and/or estimated trajectory of a mobile device.

In certain example implementations, a selection weighting factor may be based, at least in part, on a particular time or date. For example, a selection weighting factor for a particular venue location may be based, at least in part, on a time or date relating to an operation of a particular business, entity, or event at the particular venue location.

In certain example implementations, a selection weighting factor may be based, at least in part, a user related parameter. For example, a selection weighting factor may be based, at least in part, on an age or a gender or other like demographic parameter.

Figure 3:
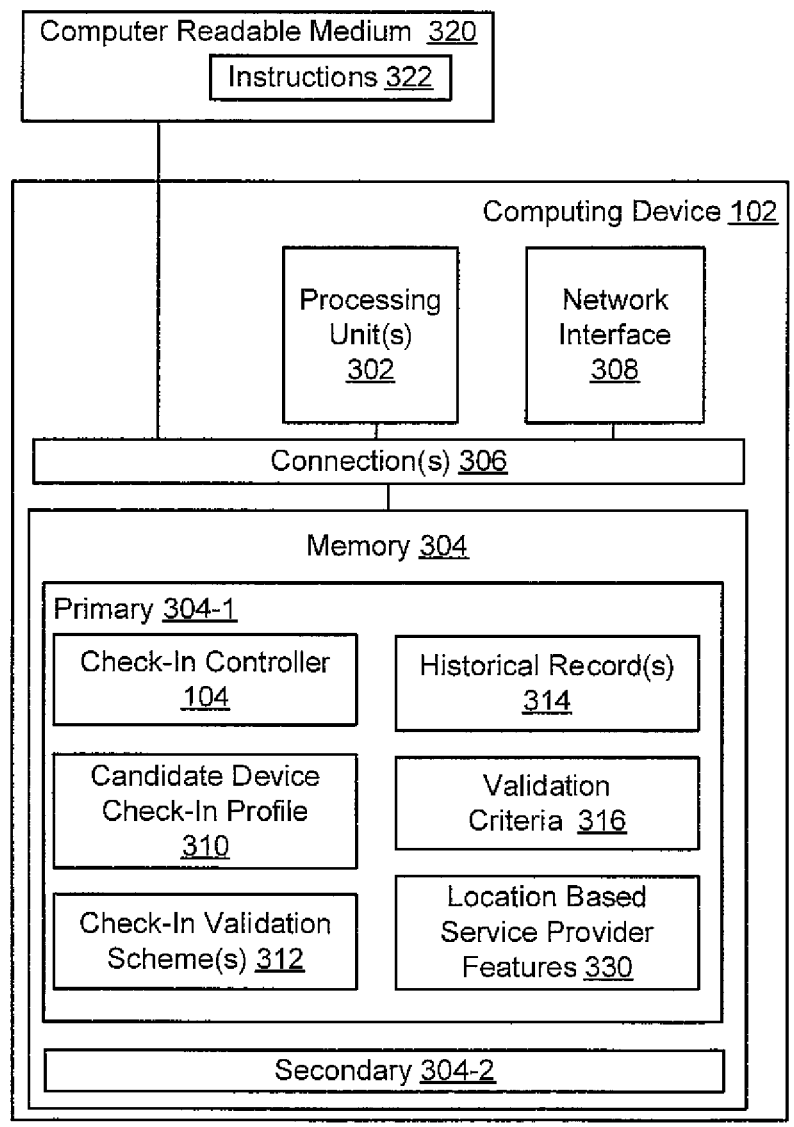
FIG. 3 is a schematic block diagram illustrating certain features of an example computing device for use in a peer device supported location-based service provider check-in, in accordance with an implementation.

FIG. 3 is a schematic block diagram illustrating certain features of an example computing device 102 for use in a peer device supported location-based service provider check-in, in accordance with an implementation.

As illustrated computing device 102 may comprise one or more processing units 302 to perform data processing (e.g., in accordance with the techniques provided herein) coupled to memory 304 via one or more connections 206. Processing unit(s) 302 may, for example, be implemented in hardware or a combination of hardware and software. Processing unit(s) 302 may, for example, be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 304 may be representative of any data storage mechanism. Memory 304 may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within computing device 102. Secondary memory 304-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, a (non-transitory) computer readable medium 220. Memory 304 and/or computer readable medium 220 may comprise computer-implementable instructions 222 for certain example techniques as provided herein.

As illustrated in FIG. 3, as various times memory 304 may store certain signals representing data and/or computer-implementable instructions for certain example techniques as provided herein. For example, memory 304 may store data and/or computer-implementable instructions for check-in controller 204. By way of example, memory 304 may at various times store one or more electrical signals representing all or part of a candidate device check-in profile 310, a check-in validation scheme 312, a historical record 314, a validation criteria 316, and/or a location based service provider feature 330.

As shown, computing device 102 may, for example, comprise a network interface 308. Network interface 308 may, for example, provide a capability to receive and/or transmit wired and/or wireless signals, e.g., to communicate via network(s) 210 (FIG. 2), and/or one or more mobile devices 106, etc.

In certain example implementations, computing device 102 may take the form of a server or other like device. In certain example implementations, computing device 102 may take the form of a wireless network element. In certain example implementations, computing device 102 may take the form of a portion of a cloud computing configuration. In certain example implementations, computing device 102 may take the form of a wireless access point or other like local area computing resource.

Candidate device check-in profile 310 is representative of any information that may be represented by one or more electrical signals and which is associated in some manner with a mobile device and at least one check-in validation scheme 312. Candidate device check-in profile 310 may be received via network interface 308, directly or indirectly, from one or more mobile devices.

For example, in accordance with example method 600 (FIG. 6), all or part of a candidate device check-in profile for first mobile device 106-1 (FIG. 1) may be transmitted by first mobile device 106-1 to second mobile device 106-2 (e.g., a peer device), and second mobile device 106-2 may either simply forward such as candidate device check-in profile 310 to computing device 102, or further establish candidate device check-in profile 310 based thereon and then transmit candidate device check-in profile 310 to computing device 102. In another example as illustrated by method 700 (FIG. 7), all or part of a candidate device check-in profile may be transmitted by second mobile device 106-2 to first mobile device 106-1, and first mobile device 106-1 may either simply forward such as candidate device check-in profile 310 to computing device 102, or further establish candidate device check-in profile 310 based thereon and then transmit candidate device check-in profile 310 to computing device 102.

Candidate device check-in profile 310 may vary depending on a selected check-in validation scheme 312. In certain example implementations, a single check-in validation scheme may be employed. In certain example implementations, a combination of various check-in validation schemes may be employed. In certain example implementations, one or more check-in validation schemes may be selected from a plurality of check-in validation schemes. For example, in certain instances it may be beneficial for a check-in controller 204 and/or a check-in engine 208 to select a check-in validation scheme based, at least in part, on a historical record with respect to other check-in processes for a particular venue location.

In certain instances it may, for example, be beneficial for a check-in controller 204 and/or a check-in engine 208 to select a check-in validation scheme based, at least in part, on a time or date, and/or some other like predetermined or otherwise determinable schedule or plan, since doing so may improve the overall security or trust of the validation process. For example, in certain instances a check-in controller 204 may inform a check-in engine 208 (e.g., in a checked in peer device, and/or in a candidate device) that one or more specific check-in validation schemes are to be used to check-in a candidate device. For example, in certain instances a check-in engine 208 (e.g., in a checked in peer device, and/or in a candidate device) may inform a check-in controller 204 or another check-in engine 208 that one or more specific check-in validation schemes are to be used to check-in a candidate device.

Some example check-in validation schemes are presented below as relating to the type of a candidate device check-in profile and corresponding validation criteria that may be used in a performing one or more check-in validation schemes. Of course, these examples represent just a few types of information and/or validation techniques that may be employed in environments 100 and/or 200 and claimed subject matter is not intended to be necessarily limited to these examples.

With this in mind, the examples below relate to check-in validation schemes that may consider various types of device or user identifiers, various types of tokens or other like parameters that may be shared by electronic devices, various types of signal measurements that may be gathered or otherwise obtained or determined, various types of sensed attributes 418 (FIG. 4) that may be gathered within an environment using one or more sensors or other like mechanisms in a mobile device, and/or the like or some combination thereof.

In accordance with an example check-in validation scheme, various types of device identifiers may be included in candidate device check-in profile 310 and which may be verified (e.g., using corresponding validation criteria). For example, candidate device check-in profile 310 may uniquely identify a candidate device (e.g., first mobile device 106-1) and/or a user of the candidate device. For example, candidate device check-in profile 310 may comprise a media access control (MAC) address, a phone number, a Bluetooth or other like signature, and/or the like for the candidate device and/or user. Similarly, in accordance with an example check-in validation scheme, candidate device check-in profile 310 may uniquely identify one or more peer devices (e.g., second mobile device 106-2) and/or the user of the peer device. For example, candidate device check-in profile 310 may comprise a MAC address, a phone number, a Bluetooth or other like signature, and/or the like for one or more peer devices that have recently communicated with (or from which signals have been received by) the candidate device or user thereof. Further still, in accordance with an example check-in validation scheme, candidate device check-in profile 310 may uniquely identify one or more wireless transmitting devices 230 (FIG. 2). For example, candidate device check-in profile 310 may comprise a MAC address, and/or the like for one or more wireless transmitting devices that have recently communicated with (or from which signals have been received by) the candidate device. In still other examples, in accordance with an example check-in validation scheme, candidate device check-in profile 310 may uniquely identify a user of a candidate device, and/or a user account to location based service provider 224 (FIG. 2). For example, candidate device check-in profile 310 may comprise a user log-in or other like related access control or other like account identifier.

In accordance with an example check-in validation scheme, a token may be included in candidate device check-in profile 310 for verification (e.g., using corresponding validation criteria). For example, candidate device check-in profile 310 may comprise a token for location based service provider, a venue location, or a peer device (e.g., second mobile device 106-2). For example, a token may comprise or otherwise relate to a particular identifier, value, bit pattern, character string, etc. For example, a peer device that may be checked-in with a location based service provider at a venue location may be obtain a token that may be used to demonstrate that the candidate device may be at or near by the venue location along with the peer device. In an example implementation, a wireless transmitting device may transmit a token that may be used to demonstrate that a candidate device may be at or near by a venue location along with a wireless transmitting device 230.

In accordance with certain example check-in validation schemes, various types of signal measurements may be included in candidate device check-in profile 310 and which may be verified (e.g., using corresponding validation criteria). For example, candidate device check-in profile 310 may comprise signal measurements representing one or more characteristics of one or more signals received by a candidate device (e.g., first mobile device 106-1). For example, candidate device check-in profile 310 may indicate a measured signal strength, a measured propagation delay, and/or other like characteristic that may be measured or otherwise determined from one or more signals received from a peer device (e.g., second mobile device 106-2), and/or from one or more wireless transmitting devices 230.

In accordance with an example check-in validation scheme, various types of sensed attribute(s) 418 (FIG. 4) may be included in candidate device check-in profile 310 and which may be verified (e.g., using corresponding validation criteria). For example, a sensed attribute may comprise an encoded representation of an environment at or near by a venue location that may be gathered using one or more sensors of a candidate device (e.g., first mobile device 106-1). For example, candidate device check-in profile 310 may comprise an estimated device location for a candidate device, e.g., as determined by a navigation receiver and/or the other like sensors.

In another example implementation, candidate device check-in profile 310 may comprise a sensed attribute based, at least in part, on at least a portion of an encoded representation of an image captured using a camera which may, for example, demonstrate that the candidate device is at or near by a venue location. By way of example, all or part of an encoded representation of a still image file or a video image frame may be captured showing a particular physical object or feature that may be identified and verified as being at a venue location based, at least in part, on a comparison to corresponding validation criteria 316 (e.g., a previously captured image). Similarly in an example implementation, candidate device check-in profile 310 may comprise a sensed attribute gathered using a camera, optical scanner and/or the like which may, for example, demonstrate that the candidate device is at or near by a particular machine readable object provided for at a venue location (e.g., based, at least in part, on a comparison to corresponding validation criteria 316). By way of example, a sensed attribute may be based, at least in part, on a particular machine readable object (e.g., a bar code, optical character recognizable text, a Quick Reference (QR) code, etc.) which has been scanned, image captured, and/or otherwise read to demonstrate that the candidate device may be at or near by a particular venue location.

In yet another example, candidate device check-in profile 310 may comprise a sensed attribute that is based, at least in part, on at least a portion of an encoded representation of audio (sound) gathered using a microphone on the candidate device which may, for example, demonstrate that the candidate device is at or near by a particular venue location (e.g., based, at least in part, on a comparison to corresponding validation criteria 316). Hence, in certain example implementations, validation criteria 316 may comprise an encoded representation of one or more expected images, scannable objects, or sounds relating to a venue location.

In certain example implementations, candidate device check-in profile 310 may comprise a sensed attribute from a candidate device and a similarly sensed attribute from a peer device. Thus, by comparing these sensed attributes, it may be determined whether the candidate device is at or near by the peer device and/or a particular venue location. For example, both a candidate device and a peer device may record sounds in the environment at or about the same time, and samples of the resulting encoded audio recordings may be compared. For example, both a candidate device and a peer device may record an image or perhaps an ambient light level in the environment at or about the same time, and samples of the resulting encoded images and/or light levels may be compared.

Check-in controller 204 may, for example, compare or otherwise consider candidate device check-in profile 310 with regard to applicable validation criteria 316. Thus, for example, sensed attributes within candidate device check-in profile 310 may be compared with or otherwise considered with regard to previously obtained or otherwise expected sensed attributes for a particular venue location. Thus, for example, in certain instances image or sound matching and/or other like recognition/analysis techniques may be performed to determine whether a sensed attribute in candidate device check-in profile 310 is valid based, at least in part, on applicable validation criteria. Similarly, applicable validation criteria 316 may be correspond to a device or user identifier, a token, a signal measurement, an estimated device location, etc., as may be included in candidate device check-in profile 310.

A historical record 314 may, for example, relate to various candidate device check-in profiles and/or other like gathered/reported movements or actions from one or more mobile devices while at or near by a particular venue location. In certain instances, historical record 314 may be used in determining one or more selection weighting factors 416 (FIG. 4) which may be considered by a check-in engine in a mobile device to select or suggest a particular venue location.

Location based service provider feature(s) 330 may, for example, relate to location based service provider 224. In certain instances, location based service provider features 330 may, for example, comprise instructions for use in operatively providing location based service provider 224. In certain instances, location based service provider feature(s) 330 may comprise other information for a venue location, e.g., user discounts, advertisements, etc., which may be selectively provided to users via their checked-in mobile devices. In certain instances, location based service provider feature(s) may, for example, identify mobile devices that have been checked-in with the location based service provider (e.g., at a specific venue locations).

Figure 4:
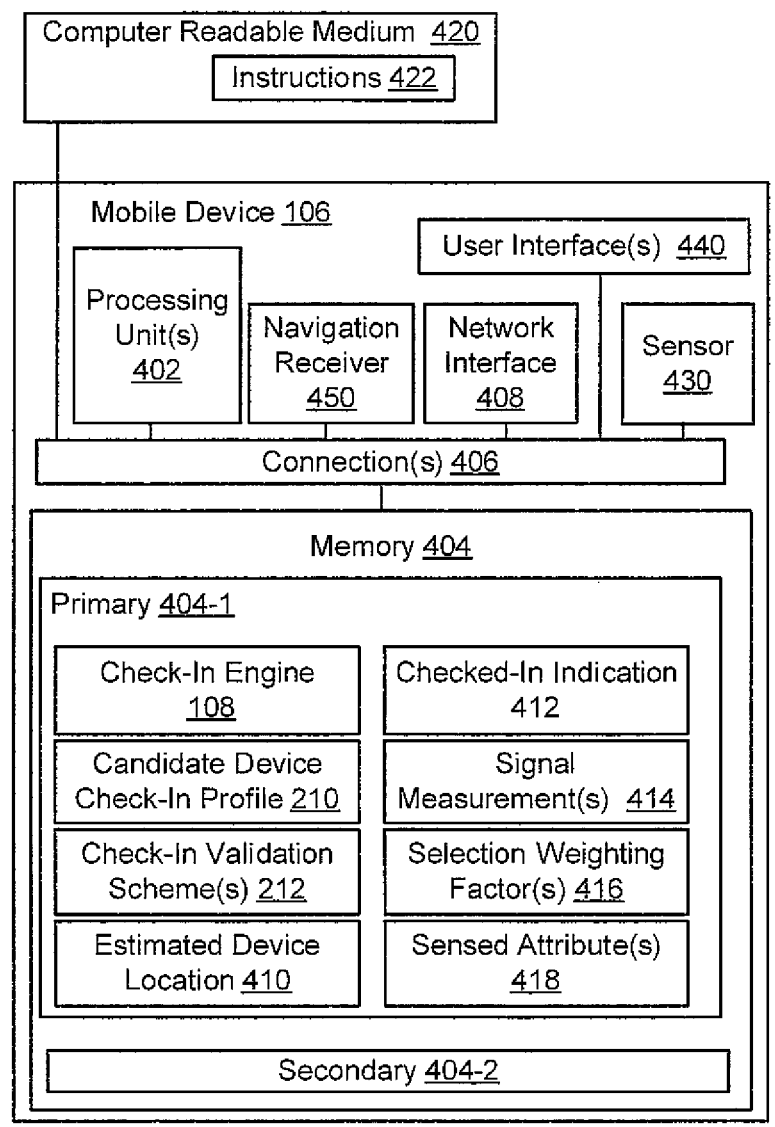
FIG. 4 is a schematic block diagram illustrating certain features of an example mobile device for use in a peer device supported location-based service provider check-in, in accordance with an implementation.

FIG. 4 is a schematic block diagram illustrating certain features of an example mobile device 106 for use in a peer device supported location-based service provider check-in, in accordance with an implementation.

As illustrated mobile device 106 may comprise one or more processing units 402 to perform data processing (e.g., in accordance with the techniques provided herein) coupled to memory 404 via one or more connections 406. Processing unit(s) 402 may, for example, be implemented in hardware or a combination of hardware and software. Processing unit(s) 402 may, for example, be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 404 may be representative of any data storage mechanism. Memory 404 may include, for example, a primary memory 404-1 and/or a secondary memory 404-2. Primary memory 404-1 may comprise, for example, a random access memory, read only memory, etc. While illustrated in this example as being separate from the processing units, it should be understood that all or part of a primary memory may be provided within or otherwise co-located/coupled with processing unit(s) 402, or other like circuitry within mobile device 106. Secondary memory 404-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, a (non-transitory) computer readable medium 420. Memory 404 and/or computer readable medium 420 may comprise computer-implementable instructions 422 for certain example techniques as provided herein.

As illustrated in FIG. 4, as various times memory 404 may store certain signals representing data and/or computer-implementable instructions for certain example techniques as provided herein. For example, memory 404 may store data and/or computer-implementable instructions for check-in engine 208. By way of example, memory 404 may at various times store data for candidate device check-in profile 310, one or more check-in validation schemes 312, an estimated device location 410, a checked-in indication 412, signal measurements 414, selection weighting factor(s) 416, and/or sensed attribute(s) 418.

As shown, mobile device 106 may, for example, comprise a network interface 408. Network interface 408 may, for example, provide a capability to receive and/or transmit wired and/or wireless signals, e.g., to communicate via network(s) 210 (FIG. 2), one or more other mobile devices (peer devices), one or more wireless transmitting devices 230, and/or the like. Network interface 408 may, for example, support a plurality of different wireless communication technologies. In certain instances, network interface 408 may, for example, support various radio frequency (RF) based wireless communication technologies. In certain instances, network interface 408 may, for example, support various non-RF based wireless communication technologies, (e.g., infrared, light, etc.).

As shown, mobile device 106 may, for example, comprise a navigation receiver 450, which may provide position location and/or other navigation services based on wireless signals transmitted by various wireless transmitting devices. For example, navigation receiver 450 may comprise an SPS receiver capable of receiving and processing one or more Global Navigation Satellite Systems (GNSSs), or other like satellite and/or terrestrial locating services, such as, e.g., one or more location based services (LBSs) which may be provided, at least in part, by a cellular network, a WiFi network, etc. Estimated device location 410 may be based, at least in part, on one or more electrical (electronic) signals generated by navigation receiver 450. Estimated device location 410 may comprise an estimated location of mobile device 106. In certain example implementations, an estimated location may comprise an initial estimated location and/or an enhanced estimated location, should the later be desired and/or otherwise available.

Mobile device 106 is representative of any electronic device that may be moved about within environments 100 and/or 200. For example, mobile device 106 may comprise a hand-held computing and/or communication device, such as, a mobile telephone, smart phone, lap top computer, tablet computer, navigation device, and/or the like. In certain example implementations, mobile device 106 may be part of a circuit board, an electronic chip, etc.

It should be understood that mobile device 106 may also or alternatively comprise one or more other circuits, mechanisms, etc., (not shown) that may be of use in performing one or more other functions or capabilities, and/or supportive of certain example techniques as provided herein. For example, mobile device 106 may comprise one or more input/output devices (e.g., a display, a touch pad, a key pad, a button, a port, a digital camera, a speaker, a microphone, etc.), a power supply (e.g., a battery), and/or the like.

Computing device 102 and/or mobile device 106 may, for example, be enabled (e.g., via one or more network interfaces) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

User interface(s) 440 may, for example, comprise one or more user input devices (e.g., a button, a touchpad, a touch screen, a sensor, etc.) and/or one or more user output devices (e.g., a display, a light, a speaker, a vibrating mechanism, etc.).

Sensor 430 may comprise one or more inertial sensors (e.g., an accelerometer, a gyroscope/gyrometer, a proximity sensor, etc.), and/or one or more environment sensors (e.g., a light sensor, an optical scanner, a camera, a microphone, a thermometer, a barometer, a magnetometer, a compass, etc.).

Figure 5:
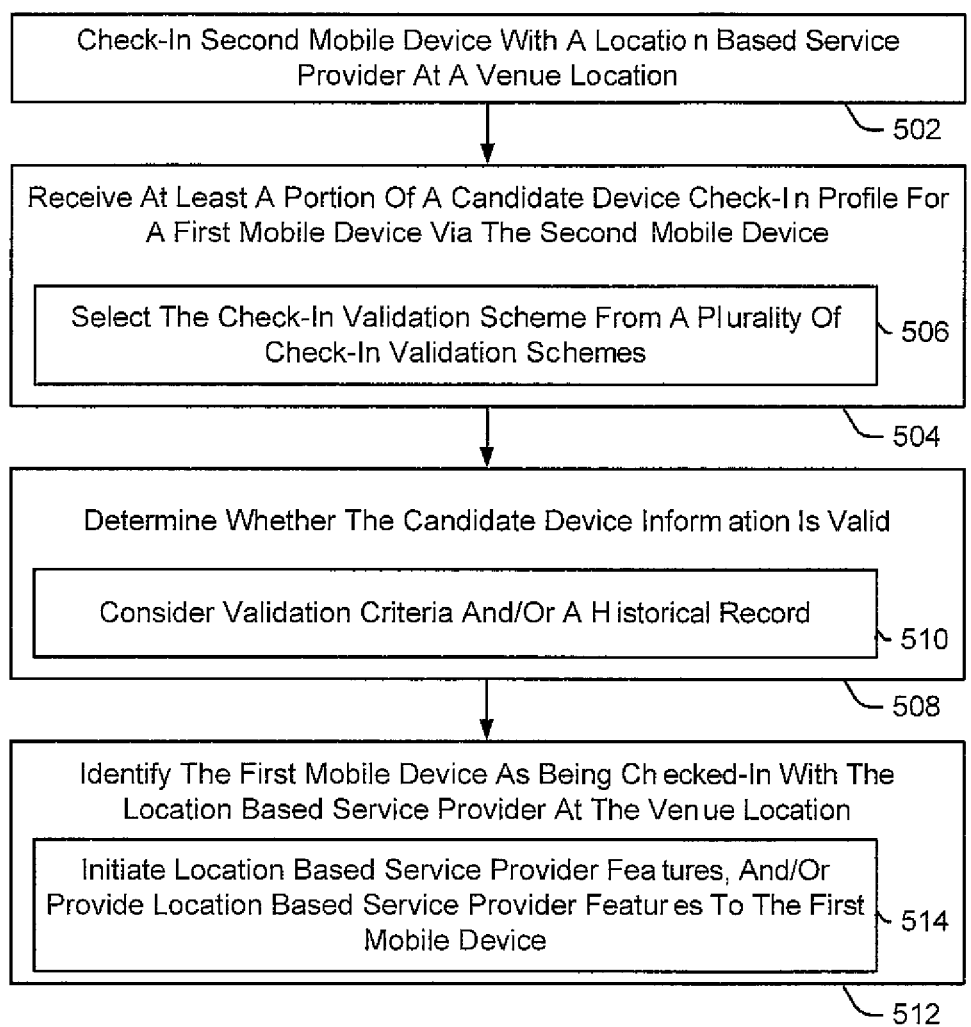
FIG. 5 is a flow diagram illustrating certain features of an example method that may be implemented in one or more computing devices for use in a peer device supported location-based service provider check-in, in accordance with an implementation.

FIG. 5 is a flow diagram illustrating certain features of an example method 500 that may be implemented in one or more computing devices 102 for use in a peer device supported location-based service provider check-in, in accordance with an implementation. Here, it is assumed that a first mobile device is the candidate device and a second mobile device is a peer device.

At example block 502, a second mobile device may be checked-in with a location based service provider at a venue location. At example block 504, a candidate device check-in profile for a first mobile device and a check-in validation scheme of a location based service provider may be received. At least a portion of the candidate device check-in profile may, for example, be received via the second mobile device. In certain example implementations, at block 506, a check-in validation scheme may be selected from a plurality of check-in validation schemes. For example, a check-in validation scheme may be selected based on a type of device, a time or date, and/or according to some other characteristic or plan.

At example block 508, a determination may be made as to whether the received a candidate device check-in profile is or is not valid. For example, at block 510, validation criteria, and/or a historical record (e.g., gathered from a plurality of mobile devices associated with the venue location and/or the particular location) may be considered.

At example block 512, first mobile device may be identified as being checked-in with the location based service provider the venue location, in response to a determination that the candidate device check-in profile is valid. For example, at block 514, location based service provider features may be initiated and/or provided to a first mobile device once checked-in with the location based service provider.

FIG. 6 is a flow diagram illustrating certain features of an example method 600 that may be implemented in a first mobile device for use in a peer device supported location-based service provider cheek-in wherein a second mobile device transmits at least a portion of a candidate device check-in profile to a computing device, in accordance with an implementation. Here, it is assumed that a first mobile device is the candidate device and a second mobile device is a peer device.

At example block 602, an estimated location of a first mobile device may be associated with a venue location from which a location based service provider permits a check-in.

At example block 604, a transmission may be initiated of at least a portion of a candidate device check-in profile for the first mobile device and a check-in validation scheme to a second mobile device that is identified as being checked-in with the location based service provider at the venue location.

At example block 606, an indication may be received indicating that the first mobile device has been successfully checked-in with the location based service provider at the venue location. The indication may be being based, at least in part, on a determination that the candidate device check-in portion is valid as determined, at least in part, by a computing device that has received at least a portion of the candidate device check-in profile from the second device.

FIG. 7 is a flow diagram illustrating certain features of an example method 700 that may be implemented in a first mobile device for use in a peer device supported location-based service provider check-in wherein the first mobile device transmits at least a portion of a candidate device check-in profile to a computing device, in accordance with an implementation. Here, it is assumed that a first mobile device is the candidate device and a second mobile device is a peer device.

At example block 702, an estimated location of a first mobile device may be associated with a venue location from which a location based service provider permits a check-in.

At example block 704, a transmission may be initiated of a candidate device check-in profile for the first mobile device and a check-in validation scheme to a computing device. At least a portion of the candidate device check-in profile may be based, at least in part, on a signal received from a second mobile device that is identified as being checked-in with the location based service provider at the venue location.

At example block 706, an indication may be received indicating that the first mobile device has been successfully checked-in with the location based service provider at the venue location. The indication may be based, at least in part, on a determination that at least the portion of the candidate device check-in profile that is based, at least in part, on the signal received from the second mobile device is valid as determined, at least in part, by the computing device.

FIG. 8 is a flow diagram illustrating certain features of an example method 800 that may be implemented in a (peer) mobile device for use in a peer device supported location-based service provider check-in wherein the mobile device transmits at least a portion of a candidate device check-in profile associated with a first mobile device to a computing device, in accordance with an implementation. Here, it is assumed that a first mobile device is the candidate device and the mobile device is a peer device to the candidate device.

At example block 802, for a mobile device (which will act as a peer device) a check-in with a location based service provider at a venue location may be performed. The location based service provider permits a separate check-in from a first mobile device. In certain instances, the (peer) mobile device may be checked-in using the same or a different check-in validation scheme as may be used in the separate check-in.

At example block 804, at least a portion of a candidate device check-in profile associated with the first mobile device and a check-in validation scheme may be received from the first mobile device.

At example block 806, the mobile station may transmit at least the portion of the candidate device check-in profile to a computing device capable of determining whether the candidate device check-in profile is valid.

FIG. 9 is a flow diagram illustrating certain features of an example method 900 that may be implemented in a (peer) mobile device for use in a peer device supported location-based service provider check-in wherein the mobile device transmits a candidate device check-in profile associated with a first mobile device to the first mobile device, in accordance with an implementation. Here, it is assumed that a first mobile device is the candidate device and the mobile device is a peer device to the candidate device.

At example block 902, for a mobile device (which will act as a peer device) a check-in with a location based service provider at a venue location may be performed. The location based service provider permits a separate check-in from a first mobile device.

At example block 904, a signal may be received from the first mobile device. In certain instances, the signal from the first mobile device may, for example, comprise all or part of a candidate device check-in profile or a candidate device check-in profile may be based, at least in part, thereon.

At example block 906, at least a portion of a candidate device check-in profile for use in the separate check-in may be transmitted to the first mobile device.

With the example peer-based or otherwise peer-supported techniques presented herein, it should be recognized that the resulting a candidate device check-in profile may provide for an automated check-in process and/or support a user interactive check-in process in which a location based service provider may better trust that a candidate device is indeed likely at or near by a particular venue location.

Reference throughout this specification to "one example", "an example", "certain examples", or "example implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, with a computing device:
   receiving one or more electrical signals representing a candidate device check-in profile for a first mobile device, said candidate device check-in profile being for use in a check-in validation scheme of a location based service provider, wherein at least a portion of said candidate device check-in profile is received via a second mobile device that is identified as being checked-in at a venue location with said location based service provider wherein said candidate device check-in profile comprises a first sensed attribute based, at least in part, on one or more of a first light or a first sound sensed via one or more sensors of said first mobile device and a second sensed attribute based, at least in part, on one or more of a second light or a second sound sensed via one or more sensors of said second mobile device;
   determining whether said candidate device check-in profile is valid based, at least in part, on a comparison of said first sensed attribute and said second sensed attribute; and
   in response to a determination that said candidate device check-in profile is valid, identifying said first mobile device as being checked-in with said location based service provider at said venue location.

2. The method as recited in claim 1, wherein said candidate device check-in profile is based, at least in part, on one or more messages transmitted between said first mobile device and said second mobile device using a first wireless interface, and wherein said at least said portion of said candidate device check-in profile is received from said second mobile device using a second wireless interface that is different from said first wireless interface.

3. The method as recited in claim 1, wherein said second mobile device is previously checked-in with said location based service provider at said venue location using a different check-in validation scheme.

4. The method as recited in claim 1, and further comprising, with said computing device:
   determining whether said candidate device check-in profile is valid based, at least in part, on a comparison of said candidate device check-in profile to at least one of: a validation criteria; or a historical record.

5. The method as recited in claim 1, and further comprising:
selecting said check-in validation scheme from a plurality of check-in validation schemes.

6. An apparatus comprising:
means for receiving a candidate device check-in profile for a first mobile device, said candidate device check-in profile being for use in a check-in validation scheme of a location based service provider, wherein at least a portion of said candidate device check-in profile is received via a second mobile device that is identified as being checked-in at a venue location with said location based service provider wherein said candidate device check-in profile comprises a first sensed attribute based, at least in part, on one or more of a first light or a first sound sensed via one or more sensors of said first mobile device and a second sensed attribute based, at least in part, on one or more of a second light or a second sound sensed via one or more sensors of said second mobile device;
means for determining whether said candidate device check-in profile is valid based, at least in part, on a comparison of said first sensed attribute and said second sensed attribute; and
means for identifying said first mobile device as being checked-in with said location based service provider at said venue location, in response to a determination that said candidate device check-in profile is valid.

7. The apparatus as recited in claim 6, wherein said candidate device check-in profile is based, at least in part, on one or more messages transmitted between said first mobile device and said second mobile device using a first wireless interface, and wherein said at least said portion of said candidate device check-in profile is received from said second mobile device using a second wireless interface that is different from said first wireless interface.

8. The apparatus as recited in claim 6, wherein said means for determining whether said candidate device check-in profile is valid comprises:
means for comparing said candidate device check-in profile to at least one of: a validation criteria; or a historical record.

9. The apparatus as recited in claim 6, and further comprising:
means for selecting said check-in validation scheme from a plurality of check-in validation schemes.

10. A computing device comprising:
a wireless network interface;
a processing unit to:
obtain a candidate device check-in profile for a first mobile device, said candidate device check-in profile being for use in a check-in validation scheme of a location based service provider, wherein at least a portion of said candidate device check-in profile is received via a second mobile device that is identified as being checked-in at a venue location with said location based service provider, wherein said candidate device check-in profile comprises a first sensed attribute based, at least in part, on one or more of a first light or a first sound sensed via one or more sensors of said first mobile device and a second sensed attribute based, at least in part, on one or more of a second light or a second sound sensed via one or more sensors of said second mobile device;
determine whether said candidate device check-in profile is valid based, at least in part, on a comparison of said first sensed attribute and said second sensed attribute; and
identify said first mobile device as being checked-in with said location based service provider at said venue location, in response to a determination that said candidate device check-in profile is valid.

11. The computing device as recited in claim 10, wherein said candidate device check-in profile is based, at least in part, on one or more messages transmitted between said first mobile device and said second mobile device using a first wireless interface, and wherein said at least said portion of said candidate device check-in profile is received from said second mobile device using a second wireless interface that is different from said first wireless interface.

12. The computing device as recited in claim 10, said processing unit to further:
determine whether said candidate device check-in profile is valid based, at least in part, on a comparison of said candidate device check-in profile to at least one of: a validation criteria; or a historical record.

13. The computing device as recited in claim 10, said processing unit to further:
select said check-in validation scheme from a plurality of check-in validation schemes.

14. An article comprising:
a non-transitory computer readable medium having stored therein computer implementable instructions executable by a processing unit in a computing device to:
obtain a candidate device check-in profile for a first mobile device, said candidate device check-in profile being for use in a check-in validation scheme of a location based service provider, wherein at least a portion of said candidate device check-in profile is received via a second mobile device that is identified as being checked-in at a venue location with said location based service provider, wherein said candidate device check-in profile comprises a first sensed attribute based, at least in part, on one or more of a first light or a first sound sensed via one or more sensors of said first mobile device and a second sensed attribute based, at least in part, on one or more of a second light or a second sound sensed via one or more sensors of said second mobile device;
determine whether said candidate device check-in profile is valid based, at least in part, on a comparison of said first sensed attribute and said second sensed attribute; and
in response to a determination that said candidate device check-in profile is valid, identify said first mobile device as being checked-in with said location based service provider at said venue location.

15. The article as recited in claim 14, said computer implementable instructions being further executable by said processing unit to:
determine whether said candidate device check-in profile is valid based, at least in part, on a comparison of said candidate device check-in profile to at least one of: a validation criteria; or a historical record.

16. The article as recited in claim 14, said computer implementable instructions being further executable by said processing unit to:
select said check-in validation scheme from a plurality of check-in validation schemes.

17. A method comprising, with a first mobile device:
associating an estimated location of said first mobile device with a venue location from which a location based service provider permits a check-in;
initiating transmission of one or more wireless signals representing at least a portion of a candidate device check-in profile for said first mobile device, said candidate device check-in profile being for use in a check-in validation scheme of said location based service provider, to a second mobile device that is identified as being checked-in at said venue location with said location based service provider, and wherein said portion of said candidate device check-in profile comprises a first sensed attribute based, at least in part, on one or more of a first light or a first sound sensed via one or more sensors of said first mobile device; and
receiving one or more wireless signals representing an indication that said first mobile device has been successfully checked-in at said venue location with said location based service provider, said indication being based, at least in part, on a determination that said at least said portion of said candidate device check-in portion is valid as determined, at least in part, by a computing device that received said at least said portion of said candidate device check-in profile from said second device and at least a second sensed attribute based, at least in part, on one or more of a second light or a second sound sensed via one or more sensors of said second mobile device, and wherein said determination is based, at least in part, on a comparison of said first sensed attribute and said second sensed attribute.

18. The method as recited in claim 17, wherein said second mobile device is previously checked-in with said location based service provider at said venue location using a different check-in validation scheme.

19. The method as recited in claim 17, and further comprising, with said first mobile device:
selecting said check-in validation scheme from a plurality of check-in validation schemes.

20. The method as recited in claim 17, and further comprising, with said first mobile device:
associating said estimated location of said first mobile device with said venue location based, at least in part, on a selection weighting factor.

21. The method as recited in claim 17, and further comprising, with said first mobile device:
in response to a determination that a plurality of venue locations are at or near by an initial estimated location of said first mobile device, performing an enhanced location estimation operation to determine said estimated location of said first mobile device, wherein said estimated location is more accurate than said initial estimated location.

22. An apparatus for use in a first mobile device, the apparatus comprising:
means for associating an estimated location of a first mobile device with a venue location from which a location based service provider permits a check-in;
means for transmitting at least a portion of a candidate device check-in profile for said first mobile device, said candidate device check-in profile being for use in a check-in validation scheme of said location based service provider, to a second mobile device that is identified as being checked-in at said venue location with said location based service provider, and wherein said portion of said candidate device check-in profile comprises a first sensed attribute based, at least in part, on one or more of a first light or a first sound sensed via one or more sensors of said first mobile device; and
means for receiving an indication that said first mobile device has been successfully checked-in at said venue location with said location based service provider, said indication being based, at least in part, on a determination that said at least said portion of said candidate device check-in portion is valid as determined, at least in part, by a computing device that received said at least said portion of said candidate device check-in profile from said second device and at least a second sensed attribute based, at least in part, on one or more of a second light or a second sound sensed via one or more sensors of said second mobile device, and wherein said determination is based, at least in part, on a comparison of said first sensed attribute and said second sensed attribute.

23. The apparatus as recited in claim 22, and further comprising:
means for selecting said check-in validation scheme from a plurality of check-in validation schemes.

24. The apparatus as recited in claim 22, and further comprising:
means for associating said estimated location of said first mobile device with said venue location based, at least in part, on a selection weighting factor.

25. The apparatus as recited in claim 22, and further comprising:
means for performing an enhanced location estimation operation to determine said estimated location of said first mobile device in response to a determination that a plurality of venue locations are at or near by an initial estimated location of said first mobile device, wherein said estimated location is more accurate than said initial estimated location.

26. A first mobile device comprising:
one or more sensors;
a wireless network interface; and
a processing unit to:
associate an estimated location of the first mobile device with a venue location from which a location based service provider permits a check-in;
initiate transmission of at least a portion of a candidate device check-in profile for said first mobile device, said candidate device check-in profile being for use in a check-in validation scheme of said location based service provider, to a second mobile device that is identified as being checked-in at said venue location with said location based service provider, and wherein said portion of said candidate device check-in profile comprises a first sensed attribute based, at least in part, on one or more of a first light or a first sound sensed via said one or more sensors; and
obtain an indication that said first mobile device has been successfully checked-in at said venue location with said location based service provider, said indication being based, at least in part, on a determination that said at least said portion of said candidate device check-in portion is valid as determined, at least in part, by a computing device that received said at least said portion of said candidate device check-in profile from said second mobile device and at least a second sensed attribute based, at least in part, on one or more of a second light or a second sound sensed via one or more sensors of said second mobile device, and wherein said determination is based, at least in part, on a comparison of said first sensed attribute and said second sensed attribute.

27. The first mobile device as recited in claim 26, said processing unit to further:
select said check-in validation scheme from a plurality of check-in validation schemes.

28. The first mobile device as recited in claim 26, said processing unit to further:
said estimated location of said first mobile device with said venue location based, at least in part, on a selection weighting factor.

29. The first mobile device as recited in claim 26, said processing unit to further:
in response to a determination that a plurality of venue locations are at or near by an initial estimated location of said first mobile device, initiate an enhanced location estimation operation to determine said estimated location of said first mobile device, wherein said estimated location is more accurate than said initial estimated location.

30. An article comprising:
a non-transitory computer readable medium having stored therein computer implementable instructions executable by a processing unit in a first mobile device to:
associate an estimated location of a first mobile device with a venue location from which a location based service provider permits a check-in;
initiate transmission of at least a portion of a candidate device check-in profile for said first mobile device, said candidate device check-in profile being for use in a check-in validation scheme of said location based service provider, to a second mobile device that is identified as being checked-in at said venue location with said location based service provider, and wherein said portion of said candidate device check-in profile comprises a first sensed attribute based, at least in part, on one or more of a first light or a first sound sensed via one or more sensors of said first mobile device; and
obtain an indication that said first mobile device has been successfully checked-in at said venue location with said location based service provider, said indication being based, at least in part, on a determination that said at least said portion of said candidate device check-in portion is valid as determined, at least in part, by a computing device that received said at least said portion of said candidate device check-in profile from said second mobile device and at least a second sensed attribute based, at least in part, on one or more of a second light or a second sound sensed via one or more sensors of said second mobile device, and wherein said determination is based, at least in part, on a comparison of said first sensed attribute and said second sensed attribute.

31. The article as recited in claim 30, said computer implementable instructions being further executable by said processing unit to:
select said check-in validation scheme from a plurality of check-in validation schemes.

32. The article as recited in claim 30, said computer implementable instructions being further executable by said processing unit to:
associate said estimated location of said first mobile device with said venue location based, at least in part, on a selection weighting factor.

33. The article as recited in claim 30, said computer implementable instructions being further executable by said processing unit to:
in response to a determination that a plurality of venue locations are at or near by an initial estimated location of said first mobile device, initiate an enhanced location estimation operation to determine said estimated location of said first mobile device, wherein said estimated location is more accurate than said initial estimated location.

34. A method comprising, with a first mobile device:
associating an estimated location of said first mobile device with a venue location from which a location based service provider permits a check-in;
initiating transmission of one or more wireless signals representing a candidate device check-in profile for said first mobile device, said candidate device check-in profile being for use in a check-in validation scheme of said location based service provider, to a computing device, wherein at least a portion of said candidate device check-in profile is based, at least in part, on a wireless signal received from a second mobile device that is identified as being checked-in at said venue location with said location based service provider, and wherein said portion of said candidate device check-in profile comprises: (i) a first sensed attribute based, at least in part, on one or more of a first light or a first sound sensed via one or more sensors of said first mobile device; and (ii) a second sensed attribute based, at least in part, on one or more of a second light or a second sound sensed via one or more sensors of said second mobile device; and
receiving one or more wireless signals representing an indication that said first mobile device has been successfully checked-in with said location based service provider at said venue location, said indication being based, at least in part, on a determination that said at least said portion of said candidate device check-in profile that is based, at least in part, on said signal received from said second mobile device is valid as determined, at least in part, by said computing device based, at least in part, on a comparison of said first sensed attribute and said second sensed attribute.

35. The method as recited in claim 34, wherein said wireless signal is received from said second mobile device using a first wireless interface, and wherein said candidate device check-in profile is transmitted by said first mobile device using a second wireless interface that is different from said first wireless interface.

36. The method as recited in claim 34, and further comprising:
selecting said check-in validation scheme from a plurality of check-in validation schemes.

37. The method as recited in claim 34, and further comprising:
associating said estimated location of said first mobile device with said venue location based, at least in part, on a selection weighting factor.

38. The method as recited in claim 34, and further comprising:
in response to a determination that a plurality of venue locations are at or near by an initial estimated location of said first mobile device, performing an enhanced location estimation operation to determine said estimated location of said first mobile device, wherein said estimated location is more accurate than said initial estimated location.

39. An apparatus for use in a first mobile device, the apparatus comprising:
- means for associating an estimated location of a first mobile device with a venue location from which a location based service provider permits a check-in;
- means for transmitting a candidate device check-in profile for said first mobile device, said candidate device check-in profile being for use in a check-in validation scheme of said location based service provider, to a computing device, wherein at least a portion of said candidate device check-in profile is based, at least in part, on a wireless signal received from a second mobile device that is identified as being checked-in at said venue location with said location based service provider, and wherein said portion of said candidate device check-in profile comprises: (i) a first sensed attribute based, at least in part, on one or more of a first light or a first sound sensed via one or more sensors of said first mobile device; and (ii) a second sensed attribute based, at least in part, on one or more of a second light or a second sound sensed via one or more sensors of said second mobile device; and
- means for receiving an indication that said first mobile device has been successfully checked-in with said location based service provider at said venue location, said indication being based, at least in part, on a determination that said at least said portion of said candidate device check-in profile that is based, at least in part, on said signal received from said second mobile device is valid as determined, at least in part, by said computing device based, at least in part, on a comparison of said first sensed attribute and said second sensed attribute.

40. The apparatus as recited in claim 39, and further comprising:
- means for selecting said check-in validation scheme from a plurality of check-in validation schemes.

41. The apparatus as recited in claim 39, and further comprising:
- means for associating said estimated location of said first mobile device with said venue location based, at least in part, on a selection weighting factor.

42. The apparatus as recited in claim 39, and further comprising:
- means for performing an enhanced location estimation operation to determine said estimated location of said first mobile device, in response to a determination that a plurality of venue locations are at or near by said initial estimated location of said first mobile device, wherein said estimated location is more accurate than an initial estimated location.

43. A first mobile device comprising:
- one or more sensors;
- a wireless network interface; and
- a processing unit to:
  - associate an estimated location of said first mobile device with a venue location from which a location based service provider permits a check-in;
  - initiate transmission of a candidate device check-in profile for said first mobile device, said candidate device check-in profile being for use in a check-in validation scheme of said location based service provider, to a computing device, wherein at least a portion of said candidate device check-in profile is based, at least in part, on a wireless signal received from a second mobile device that is identified as being checked-in at said venue location with said location based service provider, and wherein said portion of said candidate device check-in profile comprises: (i) a first sensed attribute based, at least in part, on one or more of a first light or a first sound sensed via said one or more sensors; and (ii) a second sensed attribute based, at least in part, on one or more of a second light or a second sound sensed via one or more sensors of said second mobile device; and
  - obtain an indication that said first mobile device has been successfully checked-in with said location based service provider at said venue location, said indication being based, at least in part, on a determination that said at least said portion of said candidate device check-in profile that is based, at least in part, on said signal received from said second mobile device is valid as determined, at least in part, by said computing device based, at least in part, on a comparison of said first sensed attribute and said second sensed attribute.

44. The first mobile device as recited in claim 43, said processing unit to further:
- select said check-in validation scheme from a plurality of check-in validation schemes.

45. The first mobile device as recited in claim 43, said processing unit to further:
- associate said estimated location of said first mobile device with said venue location based, at least in part, on a selection weighting factor.

46. The first mobile device as recited in claim 43, said processing unit to further:
- in response to a determination that a plurality of venue locations are at or near by an initial estimated location of said first mobile device, initiate an enhanced location estimation operation to determine said estimated location of said first mobile device, wherein said estimated location is more accurate than said initial estimated location.

47. An article comprising:
- a non-transitory computer readable medium having stored therein computer implementable instructions executable by a processing unit in a first mobile device to:
  - associate an estimated location of said first mobile device with a venue location from which a location based service provider permits a check-in;
  - initiate transmission of a candidate device check-in profile for said first mobile device, said candidate device check-in profile being for use in a check-in validation scheme of said location based service provider, to a computing device, wherein at least a portion of said candidate device check-in profile is based, at least in part, on a wireless signal received from a second mobile device that is identified as being checked-in at said venue location with said location based service provider, and wherein said portion of said candidate device check-in profile comprises: (i) a first sensed attribute based, at least in part, on one or more of a first light or a first sound sensed via one or more sensors of said first mobile device; and (ii) a second sensed attribute based, at least in part, on one or more of a second light or a second sound sensed via one or more sensors of said second mobile device; and
  - obtain an indication that said first mobile device has been successfully checked-in with said location based service provider at said venue location, said indication being based, at least in part, on a determination that said at least said portion of said candidate device check-in profile that is based, at least in part, on said signal received from said second mobile device is valid as determined, at least in part, by said computing device based, at least in part, on a comparison of said first sensed attribute and said second sensed attribute.

48. The article as recited in claim 47, said computer implementable instructions being further executable by said processing unit to:
select said check-in validation scheme from a plurality of check-in validation schemes.

49. The article as recited in claim 47, said computer implementable instructions being further executable by said processing unit to:
associate said estimated location of said first mobile device with said venue location based, at least in part, on a selection weighting factor.

50. The article as recited in claim 47, said computer implementable instructions being further executable by said processing unit to:
an enhanced location estimation operation to determine said estimated location of said first mobile device, in response to a determination that a plurality of venue locations are at or near by said initial estimated location of said first mobile device, wherein said estimated location is more accurate than an initial estimated location.

51. A method comprising, with a mobile device:
performing a check-in at a venue location with a location based service provider from which said location based service provider permits a separate check-in from a first mobile device;
receiving one or more wireless signals representing at least a portion of a candidate device check-in profile for said first mobile device from said first mobile device, said candidate device check-in profile being for use in a check-in validation scheme of said location based service provider, wherein said portion of said candidate device check-in profile comprises a first sensed attribute based, at least in part, on one or more of a first light or a first sound sensed via one or more sensors of said first mobile device; and
transmitting said at least said portion of said candidate device check-in profile and at least a second sensed attribute to a computing device for determining whether said candidate device check-in profile is valid based, at least in part, on a comparison of said first sensed attribute and said second sensed attribute, said second sensed attribute being based, at least in part, on one or more of a second light or a second sound sensed via one or more sensors of said mobile device.

52. The method as recited in claim 51, wherein said at least said portion of said candidate device check-in profile is received from said first mobile device over a first wireless interface, and wherein said at least said portion of said candidate device check-in profile is transmitted to said computing device by said mobile device using a second wireless interface that is different from said first wireless interface.

53. The method as recited in claim 51, wherein said check-in with said location based service provider at said venue location is performed using a different check-in validation scheme.

54. An apparatus for use in a mobile device, the apparatus comprising:
means for performing a check-in at a venue location with a location based service provider from which said location based service provider permits a separate check-in from a first mobile device;
means for receiving one or more wireless signals representing at least a portion of a candidate device check-in profile for said first mobile device from said first mobile device, said candidate device check-in profile being for use in a check-in validation scheme of said location based service provider, wherein said portion of said candidate device check-in profile comprises a first sensed attribute based, at least in part, on one or more of a first light or a first sound sensed via one or more sensors of said first mobile device; and
means for transmitting said at least said portion of said candidate device check-in profile and at least a second sensed attribute to a computing device for determining whether said candidate device check-in profile is valid based, at least in part, on a comparison of said first sensed attribute and said second sensed attribute, said second sensed attribute being based, at least in part, on one or more of a second light or a second sound sensed via one or more sensors of said mobile device.

55. A mobile device comprising:
one or more sensors;
a wireless network interface; and
a processing unit to:
perform a check-in at a venue location with a location based service provider from which said location based service provider permits a separate check-in from a first mobile device;
receive at least a portion of a candidate device check-in profile for said first mobile device from said first mobile device via said wireless network interface, said candidate device check-in profile being for use in a check-in validation scheme of said location based service provider, wherein said portion of said candidate device check-in profile comprises a first sensed attribute based, at least in part, on one or more of a first light or a first sound sensed via one or more sensors of said first mobile device; and
initiate transmission, via said wireless network interface, of said at least said portion of said candidate device check-in profile and at least a second sensed attribute to a computing device for determining whether said candidate device check-in profile is valid based, at least in part, on a comparison of said first sensed attribute and said second sensed attribute, said second sensed attribute being based, at least in part, on one or more of a second light or a second sound sensed via said one or more sensors of said mobile device.

56. The mobile device as recited in claim 55, wherein said at least said portion of said candidate device check-in profile is received from said first mobile device over a first wireless interface, and wherein said at least said portion of said candidate device check-in profile is transmitted to said computing device by said mobile device using a second wireless interface that is different from said first wireless interface.

57. An article comprising:
a non-transitory computer readable medium having stored therein computer implementable instructions executable by a processing unit in a second mobile device to:
perform a check-in at a venue location with a location based service provider from which said location based service provider permits a separate check-in from a first mobile device;
receive at least a portion of a candidate device check-in profile for said first mobile device from said first mobile device, said candidate device check-in profile being for use in a check-in validation scheme of said location based service provider, wherein said portion of said candidate device check-in profile comprises a first sensed attribute based, at least in part, on one or more of a first light or a first sound sensed via one or more sensors of said first mobile device; and initiate transmission of said at least said portion of said candidate device check-in profile and at least a second sensed attribute to a computing device for determining whether said candidate device check-in profile is valid based, at least in part, on a comparison of said first sensed attribute and said second sensed attribute, said second sensed attribute being based, at least in part, on one or more of a second light or a second sound sensed via said one or more sensors of said second mobile device.

58. The article as recited in claim 57, wherein said at least said portion of said candidate device check-in profile is received from said first mobile device over a first wireless interface, and wherein said at least said portion of said candidate device check-in profile is transmitted to said computing device by said second mobile device using a second wireless interface that is different from said first wireless interface.

59. The method of claim 1, wherein said comparison of said first sensed attribute and said second sensed attribute comprises a comparison of one or more environmental sounds recorded approximately concurrently by said first and second mobile devices.

* * * * *